United States Patent [19]

Wienhold

[11] Patent Number: 4,900,202

[45] Date of Patent: Feb. 13, 1990

[54] CHUCK ASSEMBLY FOR TOOL BITS

[76] Inventor: James L. Wienhold, 11800 Briar La., Minnetonka, Minn. 55343

[21] Appl. No.: 241,710

[22] Filed: Sep. 8, 1988

[51] Int. Cl.$^4$ .............................................. B23B 31/04
[52] U.S. Cl. .................... 408/240; 279/1 B; 279/22; 279/75
[58] Field of Search ................. 408/240; 279/1 B, 22, 279/30, 74, 75, 80

[56] References Cited

U.S. PATENT DOCUMENTS

| Re. 31,755 | 12/1984 | Wanner et al. | 464/167 |
|---|---|---|---|
| 81,260 | 8/1868 | Davis. | |
| 1,602,708 | 10/1926 | Russell | 279/75 |
| 2,350,565 | 6/1944 | Mills | 279/76 |
| 2,370,487 | 2/1945 | Poutie | 279/42 |
| 2,736,562 | 2/1956 | Blackburn | 279/76 |
| 2,767,992 | 10/1956 | Emrick | 279/82 |
| 2,807,473 | 9/1957 | Kiehne | 279/75 |
| 2,926,020 | 2/1960 | Dayton et al. | 279/75 |
| 2,987,334 | 6/1961 | Wendling | 287/119 |
| 3,255,792 | 6/1966 | Beck | 145/64 |
| 3,367,727 | 2/1968 | Ward et al. | 306/28 |
| 3,583,715 | 6/1971 | Jahrl | 279/75 |
| 3,672,692 | 6/1972 | Fauth | 279/82 |
| 3,945,653 | 3/1976 | Falchle | 279/97 |
| 4,209,182 | 6/1980 | Sheldon | 279/75 |
| 4,290,617 | 9/1981 | Yoshida | 279/75 |
| 4,434,859 | 3/1984 | Rumpp et al. | 173/48 |
| 4,577,875 | 3/1986 | Miyakawa | 279/75 |
| 4,588,335 | 5/1986 | Pearson, Jr. | 408/239 R |
| 4,594,036 | 6/1986 | Hogenhout | 408/240 |
| 4,692,073 | 9/1987 | Martindell | 408/239 |

Primary Examiner—Daniel Howell
Attorney, Agent, or Firm—Kinney & Lange

[57] ABSTRACT

A chuck assembly for a tool bit includes a spindle with a quick release mechanism and is adapted to prevent undesired axial extraction of the tool bit from the spindle. The tool bit includes a shank portion with a circumferential groove. A longitudinally extending bore is provided in the spindle for receiving the shank portion of the tool bit. The shank is retained in the bore by detent balls extending into the bore and against the circumferential groove. The balls are disposed around the shank in an opposing manner to help center the shank. Attempted axial extraction of the tool bit from the bore without release of the balls locks the balls against a retaining face and a biased locking shoulder preventing extraction of the tool bit from the bore.

6 Claims, 3 Drawing Sheets

CHUCK ASSEMBLY FOR TOOL BITS

BACKGROUND OF THE INVENTION

1. Field of the Invention

The invention relates to chuck assemblies for tool bits and, more particularly, to a quick release chuck adapted to prevent undesired axial extraction of a tool bit such as a drill from the chuck assembly.

2. Description of the Prior Art

Tool bits include tools used for drilling, driving fastener devices such as screws, nuts and bolts, and other work elements requiring rotational motion. The American National Standards Institute has a specification for such tools known as ANSI B107.4-1982 which refers to driving and spindle ends for portable powered and hand held machines using the tool bits. Tool bits in accordance with the standard have a hexagonally configured shank with a circumferential groove formed into the shank. The circumferential groove has a flat, bottom portion disposed between two radiused shoulder portions. The standard reflects the long term and pervasive use of such tool bits and the large inventory of tools available.

It has long been recognized that the ability to quickly change tool bits in the spindle of a power source is an advantageous feature. Numerous examples exist in the art of quick release tool chucks. An example of one such quick release chuck apparatus is that described in U.S. Pat. No. 4,692,073. The quick release chuck disclosed therein includes a spring biased sleeve disposed on a spindle having an inclined cam surface disposed against a single ball. The ball in turn applies normal and tangential forces against a groove in the shank of the tool bit to hold the tool bit in a bore. The sleeve is urged into contact with the ball by a compression spring disposed between the spindle and the sleeve. A ring secured to the spindle limits the movement of the sleeve in one direction, and the compression spring and the spindle limit the movement of the sleeve in the opposite direction.

U.S. Pat. No. 4,692,073 addresses objectionable end play caused by the presence of the flat, bottomed portion of the circumferential groove in the tool bits. However, construction of devices taught by the patent require maintenance of extremely tight manufacturing standards with respect to the radius of the ball and both the radius of the radial bore it travels in and the radius of the radiused shoulders in the groove which it abuts against. The ramped sleeve which is used to apply normal and tangential forces to the ball can allow the ball to be forced out of the retaining position by a large outward axial force applied to the tool. A large outward axial force can occur, for example, where the tool bit is a drill bit being removed from a freshly drilled bore. Use of a single detent ball can also result in a nonconcentric orientation of the tool.

SUMMARY OF THE INVENTION

A chuck assembly for a tool bit includes a spindle with a quick release mechanism adapted to prevent undesired axial extraction of the tool bit from the spindle. The tool bit includes a shank portion with a circumferential groove in accordance with the ANSI standard. A longitudinally extending bore is provided in the spindle for receiving the shank portion of the tool bit. Opposing radial bores communicate with the shank receiving bore. Detent balls are disposed in the opposing radial bores. The shank is retained in the bore by the balls, which extend from the radial bores into the shank receiving bore and against the circumferential groove.

The detent balls disposition around the shank in opposing positions help center the shank. A spring biased shoulder is urged against the balls locking them against a retaining face. Attempted axial extraction of the tool bit from the bore, without release of the detent balls, pulls the balls against a retaining face producing an opposite tangential force to the axial retraction force. The responsive tangential force prevents extraction of the tool bit from the shank receiving bore.

DETAILED DESCRIPTION OF THE PREFERRED EMBODIMENTS

Figure 1:
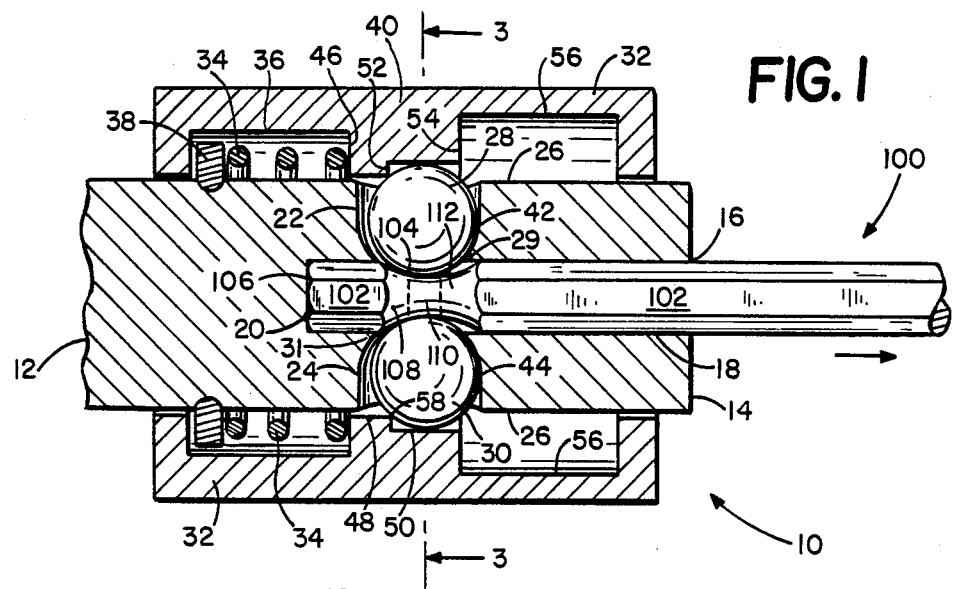
FIG. 1 is a vertical cross sectional view of the chuck assembly with a fitted shank portion from a tool bit.

FIG. 1 illustrates chuck assembly 10 of the present invention. Chuck assembly 10 is shown mated with a tool bit 100 which is usable with a power tool or other device incorporating the chuck assembly. Chuck assembly 10 includes a spindle 12 which provides connection to the power tool. Tool bit 100 can be a drill, a driver for a fastener, or some other device. Tool bit 100 includes a hexagonally shaped shank portion 102 for mating the tool bit to spindle 12.

Spindle 12 terminates in a forward face 14. A forward opening 16 is centered in forward face 14 for admitting tool bit 100 to shank receiving bore 18. Shank receiving bore 18 is hexagonally shaped and extends rearwardly from front opening 16 into spindle 12 substantially aligned along the longitudinal axis of the spindle. Receiving bore 18 terminates in spindle 12 along a rear terminating end 20 which is a face generally perpendicular to the longitudinal axis of the spindle.

Opposed first and second radially extending bores 22 and 24 communicate with bore 18. First and second radially extending bores 22 and 24 extend from bore 18 through spindle 12 to an outer cylindrical surface 26 of the spindle. Detent balls 28 and 30 are disposed in radially extending bores 22 and 24, respectively. Balls 28 and 30 are sized to fit loosely in the radially extending bores, permitting the balls to move axially within bores 22 and 24, respectively, and extend into bore 18 into contact with tool bit 100. Shoulders 29 and 31 disposed in bores 22 and 24 adjacent shaft 18 prevent detent balls 28 and 30 from passing completely into shaft 18.

Detent balls 28 and 30 are held in position extending into bore 18 by a movable sleeve 32 disposed around outer cylindrical surface 26 when the movable sleeve 32 is in a maximum forward position. Movable sleeve 32 is biased toward the forward end of spindle 12 by a compression spring 34. Compression spring 34 is held in a rear bore 36 of movable sleeve 32 between the movable sleeve and spindle 12. Compression spring 34 bears against a flange 38 mounted around outer cylindrical surface 26 and a radially inwardly extending locking shoulder 40 of movable sleeve 32.

Rearward movement of movable sleeve 32 along the longitudinal axis of spindle 12 compresses compression spring 34 between flange 38 and locking shoulder 40. Compression spring 34 biases movable sleeve 32 forward bringing locking shoulder 40 into contact with detent balls 28 and 30, urging detent balls 28 and 30 forward into contact with retaining portions 42 and 44 of radial bores 22 and 24, respectively. In its forward biased position, locking shoulder 40 also holds detent balls 28 and 30 against tool bit 100 in bore 18.

Locking shoulder 40 can have any one of several profiles as discussed below. In FIG. 1, locking shoulder 40 includes a rearward oriented face 46 which is generally perpendicular to the longitudinal axis of spindle 12 for providing a surface against which compression spring 34 can bear. Forward from and adjacent to rearward face 46 is a center bore portion 48 which is of a substantially minimum diameter allowing free movement of movable sleeve 32 over outer cylindrical surface 26 of spindle 12. Forward from center bore 48 is an intermediate bore 50. Between center bore 48 and intermediate bore 50 is a forward oriented face 52, which is substantially perpendicular to the longitudinal axis of spindle 12 and is adjacent both the center bore and the intermediate bore. Locking shoulder 40 also includes a second forward oriented face 54 immediately forward intermediate bore 50 and adjacent a forward bore 56 of movable sleeve 32.

Detent balls 28 and 30 are locked against retaining portions 42 and 44 of radially extending bores 22 and 24 as locking shoulder 40 is urged forward into substantial alignment with bores 22 and 24 and into contact with the balls. Locking shoulder 40 makes contact with detent balls 28 and 30 at two points on the balls allowing the locking shoulder to apply force to the detent balls in directions both normal and parallel to the longitudinal axis of spindle 12. The points of contact are along intermediate bore 50 and an intersection 58 between center bore 48 and forward oriented face 52. Both tangential and normal forces are applied to detent balls 28 and 30 at the contact point along intersection 52. Generally normal forces are applied to detent balls 28 and 30 at their contact points on intermediate bore 50. Balls 28 and 30 are also prevented from rotating by frictional forces tangential to the surface of the balls at the aforesaid contact points and at an additional contact point along retaining portions 42 and 44.

Locking of the positions of detent balls 28 and 30 retains and fixes the position of tool bit 100 disposed in hexagonal receiving bore 18. Shank portion 102 is a typically hexagonally shaped (although other noncircular profiles are known) end portion of a tool bit and is sized to fit snugly in receiving bore 18. Shank portion 102 includes a circumferential groove 104 near shank end 106. Circumferential groove 104 includes three distinct surface profiles, including a radially inwardly extending rear radiused shoulder 108, a centered flat portion 110 and a radially inwardly extending forward radiused shoulder 112.

Radially extending bores 22 and 24 are spaced from rear terminating end 20 of receiving bore 18 to be substantially aligned with circumferential groove 104 when shank portion 102 is fully admitted to bore 20. At such time shank end 106 abuts rear terminating end 20. Forward or outward axial forces applied to tool bit 100 bring rear radiused shoulder 108 into contact with detent balls 28 and 30. The radius of radiused shoulder 108 is substantially the same as the radius of detent balls 28 and 30, and, accordingly, detent balls 28 and 30 make contact along lines on the rear radiused shoulder running substantially the entire front to rear length of the shoulder. Detent balls 28 and 30 are locked against rotation as described above and resist outward motion of tool bit 100 because of a force applied to the balls by retaining portions 42 and 44 opposite the extracting force. Detent balls 28 and 30 transmit the tool bit 100 opposite responsive axial force to the extracting force, thus preventing extraction of tool bit 100 from bore 18.

Figure 2:
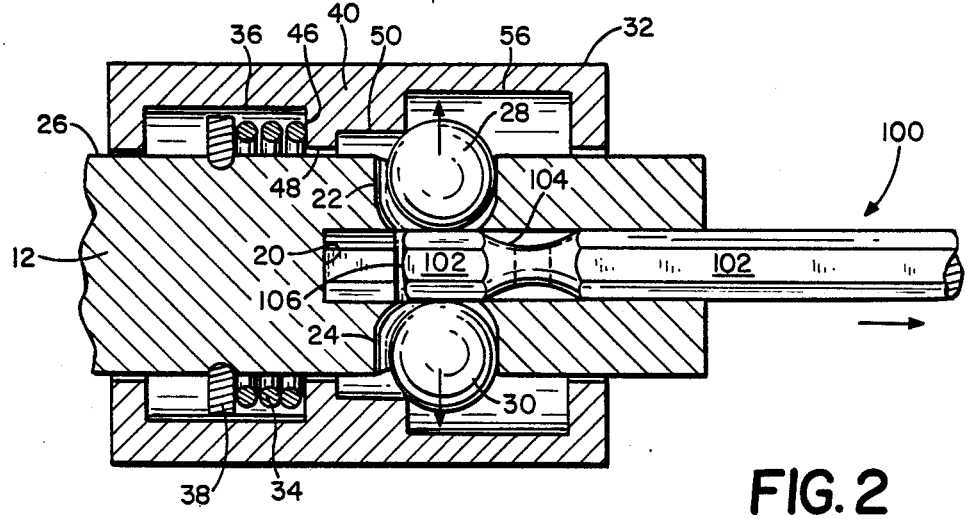
FIG. 2 is a vertical cross sectional view of the chuck assembly showing actuation of the quick release feature and partial extraction of a tool bit from the chuck assembly.

FIG. 2 illustrates extraction of tool bit 100 from receiving bore 18. Movable sleeve 32 is translated rearward relative to spindle 12 retracting locking shoulder 40 from alignment with bores 22 and 24, thus freeing detent balls 28 and 30. Application of an extractive axial force to tool bit 100 now results in outward radial displacement of detent balls 28 and 30 partially into forward bore 56 and out of receiving bore 18 as the detent balls ride up rear radiused shoulder 108, out of circumferential groove 104 and onto the rear part of shank 102. Tool bit 100 is now easily removed from receiving bore 18 allowing replacement of the tool bit with another.

Figure 3:
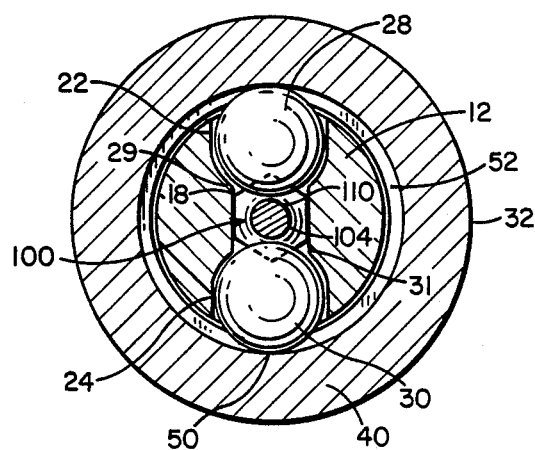
FIG. 3 is a cross sectional view of the chuck assembly taken along section line 3—3 of FIG. 1.

FIG. 3 is a cross sectional view of chuck assembly 10 taken along section line 3—3 of FIG. 1. Detent balls 28 and 30 are seen spaced slightly from center flat portion 110 along circumferential groove 104. The extension of detent balls 28 and 30 into bore 18 is easily seen. The alignment of bore 18 is indicated in phantom. Radially extending bores 22 and 24 are in opposing alignment along their respective longitudinal axes. Detent balls 28 and 30 are fixed in extension into bore 18 by contacting movable sleeve along center bore 50 of locking shoulder 40.

Figure 4:
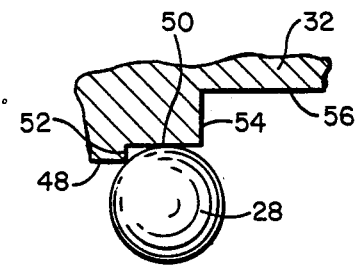
FIG. 4 is a cross section of a profile for the locking shoulder of the chuck assembly.
Figure 5:
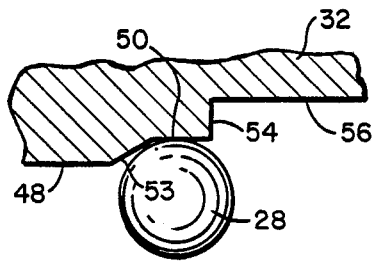
FIG. 5 is a cross section of a second profile for the locking shoulder of the chuck assembly.

FIGS. 4, 5, 6 and 7 illustrate various profiles of locking shoulder 40. The profiles are characterized generally by a stepped conical shape which tapers along progressively smaller diameters from front to rear of movable sleeve 32. The profile of FIG. 4 is the same as that depicted in FIGS. 1 and 2 above. The profile of FIG. 5 is a variation of that in FIG. 4 with forward oriented face 52 replaced by a rearward conical taper 53 which provides the second contact surface for detent ball 28 along with intermediate bore 50.

Figure 6:
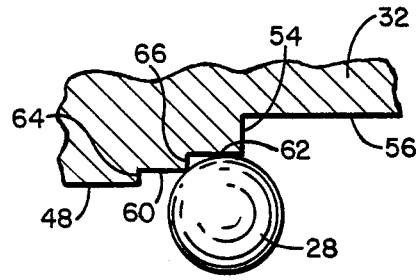
FIG. 6 is a cross section of a third profile for the locking shoulder.
Figure 7:
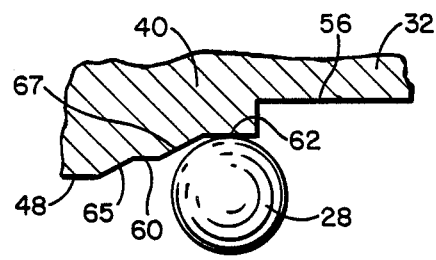
FIG. 7 is a cross section of a fourth profile for the locking shoulder.

FIG. 6 illustrates a locking shoulder 40 profile in which intermediate bore 50 has been replaced with first and second intermediate bores 60 and 62 providing stepwise progression toward larger and larger diameter bores from center bore 48 to forward bore 56. Forward oriented faces 64 and 66 are positioned between center bore 48 and first intermediate bore 60, and first intermediate bore 60 and second intermediate bore 62, respectively. In FIG. 7, forward oriented faces 64 and 66 have been replaced by rearward conical tapers 65 and 67.

The various locking shoulder 40 profiles are easily machined variations in movable sleeve 32 allowing manufacture of modified movable sleeves for application in chuck assemblies where receiving bore profiles are smaller and where detent balls are of different radiuses.

Figure 8:
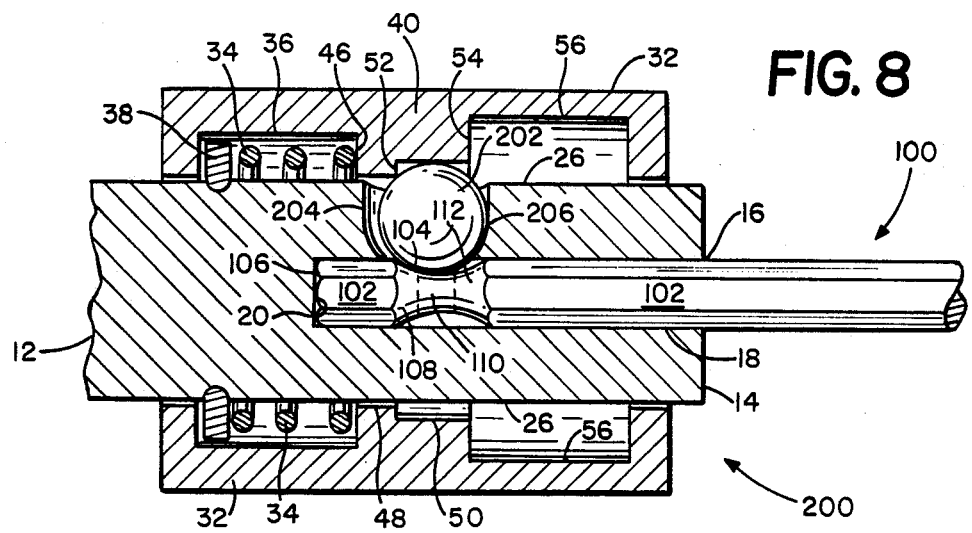
FIG. 8 is a vertical cross sectional view common to alternative embodiments of the chuck assembly of the present invention.
Figure 9A:
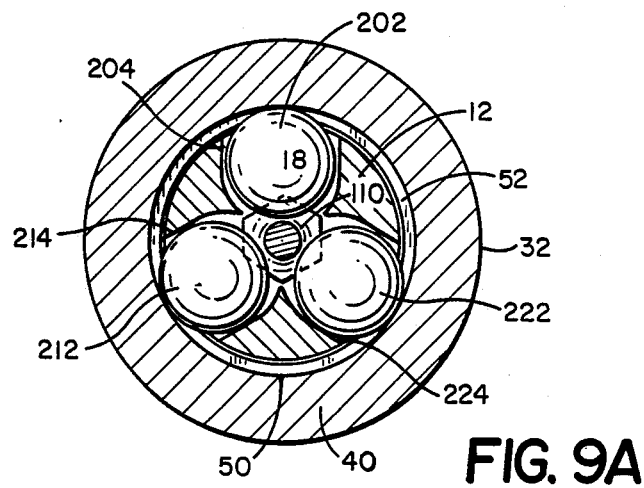
FIG. 9A is a cross sectional view of a first alternative embodiment of the chuck assembly, perpendicular to the longitudinal axis of a tool bit receiving bore.
Figure 9B:
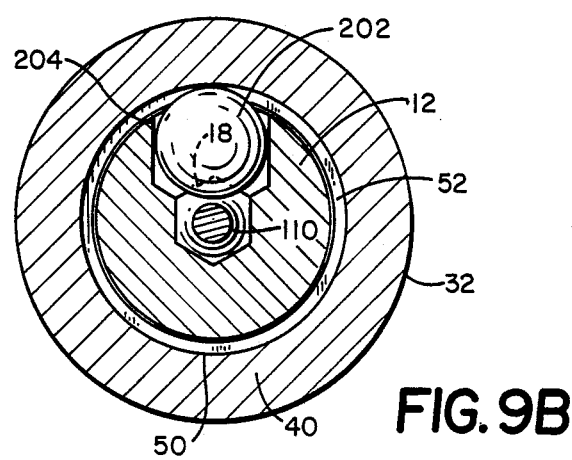
FIG. 9B is a cross sectional view of a second alternative embodiment of the chuck assembly, perpendicular to the longitudinal axis of a tool bit receiving bore.

FIGS. 8, 9A and 9B illustrate alternative embodiments of the chuck assembly of the present invention. Like numbers refer to like structures between figures. Chuck assembly 200 can be manufactured with fewer or more detent balls than the pair of opposing detent balls 28 and 30 described above. A chuck assembly 200 with one detent ball 202 would be cheaper to produce, but would not help center shank 102 in bore 18. A chuck assembly 200 with detent balls 202, 212 and 222, positioned at the vertices of a regular triangle, would provide improved centering of shank 102 in hexagonal bore 18. In theory, the number of detent balls is limited only by the size of the detent balls.

FIG. 8 illustrates detent ball 202 held against retaining portion 206 of bore 204 by locking shoulder 40 and an axially extractive force applied to tool bit 100. Detent balls 212 and 222 in bores 214 and 224, respectively, (shown in FIG. 9A), similarly retain tool bit 100 in hexagonal bore 18. The force vectors applied to tool bit 100 by detent balls 202, 212 and 224 are radially balanced, centering tool bit 100 in bore 18. Where a single detent ball 202 is used (shown in FIG. 9B), the radial force vector is balanced against bore 18 with a loss of centering vectors provided by a plurality of detent balls.

In summary, the present invention provides a quick change chuck assembly of both great simplicity of manufacture and high reliability in service. Simplicity of manufacture is aided by the lack of required close tolerances in the spindle and in the movable sleeve. The chuck assembly of the present invention is highly resistant to accidental removal of tool bits due to extractive axial forces applied to tool bits in normal work conditions.

The invention nonetheless allows highly reliable quick change of tool bits. Removal is accomplished by applying simultaneous opposite forces to the movable sleeve and to a tool bit to extract the tool bit from the spindle.

Although the present invention has been described with reference to preferred embodiments, workers skilled in the art will recognize that changes may be made in form and detail without departing from the spirit and scope of the invention.

What is claimed is:

1. A quick release chuck assembly for a tool bit having a shank and a groove extending circumferentially about the shank with a radiused portion, the chuck assembly comprising:
a spindle including,
 a forward face,
 a longitudinal bore into the spindle from the forward face having an inner end for receiving the shank of the tool bit,
 a plurality of radial bores communicating with the longitudinal bore, and
 a detent ball disposed in each radial bore and extendible into the longitudinal bore and against the groove of the shank of the tool bit;
a sleeve disposed around the spindle including,
 a forward bore disposed around the spindle for receiving the detent balls when the balls are moved out of the longitudinal bore,
 a radially inwardly extending shoulder adjacent the forward bore for engaging and urging the balls into the longitudinal bore and against the groove of the shank,
 a rear bore with the shoulder being disposed between the forward bore and the rear bore,
 the shoulder further including a substantially minimum diameter center bore permitting free translation of the sleeve around the spindle and a concentrically graduated portion between the forward bore and the center bore, and
 the concentrically graduated portion further including a first intermediate bore between the center bore and the forward bore which is larger in diameter than the center bore and smaller in diameter than the forward bore; and
a spring for biasing the sleeve against the detent balls causing the shoulder to contact the balls to urge the detent balls forward against the interior walls of the radial bores generating responsive tangential forces through the detent balls against the radiused portion of the groove and further to urge the detent balls into the longitudinal bore and against the shank whereby the detent balls are positionally locked between the shoulder, the shank and the radial bores;
whereby the shank of the tool bit is locked in position with substantially no end play between the detent balls and the inner end of the longitudinal bore.

2. The chuck assembly of claim 1 wherein the concentrically graduated portion includes a second intermediate bore between the first intermediate bore and the forward bore which is larger in diameter than the first intermediate bore and smaller in diameter than the forward bore.

3. The chuck assembly of claim 2 wherein the concentrically graduated portion includes a first forward oriented face perpendicular to the longitudinal axis of the longitudinal bore adjacent the first intermediate bore and the center bore, a second forward oriented face perpendicular to the longitudinal axis of the longitudinal bore and adjacent the first intermediate bore and the second intermediate bore, and a third intermediate face perpendicular to the longitudinal axis of the longitudinal bore and adjacent the second intermediate bore and the forward bore.

4. The chuck assembly of claim 2 wherein the concentrically graduated portion includes a first rearward oriented conical taper adjacent the first intermediate bore and the center bore and a second rearward oriented conical taper adjacent the first intermediate bore and the second intermediate bore and a first forward oriented face perpendicular to the longitudinal axis of the longitudinal bore adjacent the second intermediate bore and the forward bore.

5. The chuck assembly of claim 1 wherein the concentrically graduated portion includes a first forward oriented face perpendicular to the longitudinal axis of the non-circular bore adjacent the first intermediate bore and the center bore and a second forward oriented face perpendicular to the longitudinal axis of the non-circular bore adjacent the first intermediate and the forward bore.

6. The chuck assembly of claim 1 wherein the concentrically graduated portion includes a first rearward oriented conical taper adjacent the first intermediate bore and the center bore and a first forward oriented face perpendicular to the longitudinal axis of the longitudinal bore adjacent the first intermediate and the forward bore.

* * * * *